(12) United States Patent
Kuniya

(10) Patent No.: US 11,571,917 B2
(45) Date of Patent: Feb. 7, 2023

(54) PRINTER AND WIRELESS TAG WRITING DEVICE

(71) Applicant: TOSHIBA TEC KABUSHIKI KAISHA, Tokyo (JP)

(72) Inventor: Yoshitaka Kuniya, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/223,036

(22) Filed: Apr. 6, 2021

(65) Prior Publication Data

US 2022/0001680 A1    Jan. 6, 2022

(30) Foreign Application Priority Data

Jul. 6, 2020    (JP) .............................. JP2020-116670

(51) Int. Cl.
| | | |
|---|---|---|
| B41J 11/00 | (2006.01) | |
| B41J 3/407 | (2006.01) | |
| B41J 3/50 | (2006.01) | |
| B41J 11/46 | (2006.01) | |
| G06K 17/00 | (2006.01) | |
| B41J 21/16 | (2006.01) | |

(52) U.S. Cl.
CPC ......... *B41J 11/0045* (2013.01); *B41J 3/4075* (2013.01); *B41J 3/50* (2013.01); *B41J 11/46* (2013.01); *B41J 11/0095* (2013.01); *B41J 21/16* (2013.01); *B41J 2203/01* (2020.08); *G06K 17/0029* (2013.01)

(58) Field of Classification Search
CPC ........ B41J 11/0045; B41J 3/4075; B41J 3/50; B41J 11/46; B41J 11/0095; B41J 21/16; B41J 2203/01; G06K 17/0029
See application file for complete search history.

(56) References Cited

U.S. PATENT DOCUMENTS

| | | | | |
|---|---|---|---|---|
| 10,262,255 | B2 * | 4/2019 | Khoche | G06K 19/0702 |
| 2012/0224223 | A1 * | 9/2012 | Yamamoto | G06K 17/0025 358/1.15 |
| 2015/0199594 | A1 * | 7/2015 | Kuniya | G06K 17/0025 358/1.5 |
| 2019/0192066 | A1 * | 6/2019 | Schoess | A61B 5/0024 |

FOREIGN PATENT DOCUMENTS

JP    2008-171320    7/2008

* cited by examiner

*Primary Examiner* — Henok D Legesse
(74) *Attorney, Agent, or Firm* — Amin, Turocy & Watson, LLP

(57) ABSTRACT

According to one embodiment, there is provided a printer including a print head, a platen roller, a sheet position sensor, an antenna, and a movable portion. The print head is configured to print on a strip-shaped sheet. The platen roller is configured to move the sheet pinched between the platen roller and the print head along a longitudinal direction of the sheet. The sheet position sensor is provided on a substrate disposed on an upstream side of the print head in a conveyance direction of the sheet, and is configured to detect a position of the sheet. The antenna is provided on the substrate and is configured to write information to a wireless tag provided on the sheet. The movable portion is configured to move the substrate along a width direction of the sheet.

19 Claims, 4 Drawing Sheets

PRINTER AND WIRELESS TAG WRITING DEVICE

CROSS-REFERENCE TO RELATED APPLICATION

This application is based upon and claims the benefit of priority from Japanese Patent Application No. 2020-116670, filed on Jul. 6, 2020, the entire contents of which are incorporated herein by reference.

FIELD

Embodiments described herein relate generally to a printer and a wireless tag writing device and methods related thereto.

BACKGROUND

There is a printer that both writes information to a wireless tag such as an RFID tag and prints on a paper sheet such as a label. In such a printer, in addition to alignment of a print head and the label, an antenna for writing information and the wireless tag need to be aligned. For the alignment, for example, a paper sheet position sensor that detects a black mark provided on a paper sheet is used. A distance between the paper sheet position sensor and the print head is preferably short because the distance relates to dimensions of a usable label and accuracy of alignment.

Conventionally, the antenna used for writing information to the wireless tag is often provided on a dedicated substrate, and therefore is provided on a substrate separate from the paper sheet position sensor. Such an antenna and a paper sheet position sensor are desirably configured to be movable with respect to the print head in order to be able to respond flexibly to some extent according to design of paper sheet (that is, disposition of the label and wireless tag on a mount sheet). However, if the paper sheet position sensor and the antenna are configured to be movable, respectively, the result tends to be unfavorable from the viewpoint of cost and installation space.

DETAILED DESCRIPTION

Embodiments provide a printer or wireless tag writing device having a configuration that allows a certain flexibility degree in design of corresponding paper sheet at low cost and with less sacrifice in throughput and sensing.

In general, according to one embodiment, there is provided a printer including a print head, a platen roller, a sheet position sensor, an antenna and a movable portion. The print head is configured to print on a strip-shaped sheet. The platen roller is configured to move the sheet pinched between the platen roller and the print head along a longitudinal direction of the sheet. The sheet position sensor is provided on a substrate disposed on an upstream side of the print head in a conveyance direction of the sheet, and is configured to detect a position of the sheet. The antenna is provided on the substrate and is configured to write information to a wireless tag provided on the sheet. The movable portion is configured to move the substrate along a width direction of the sheet.

First Embodiment

Figure 1:
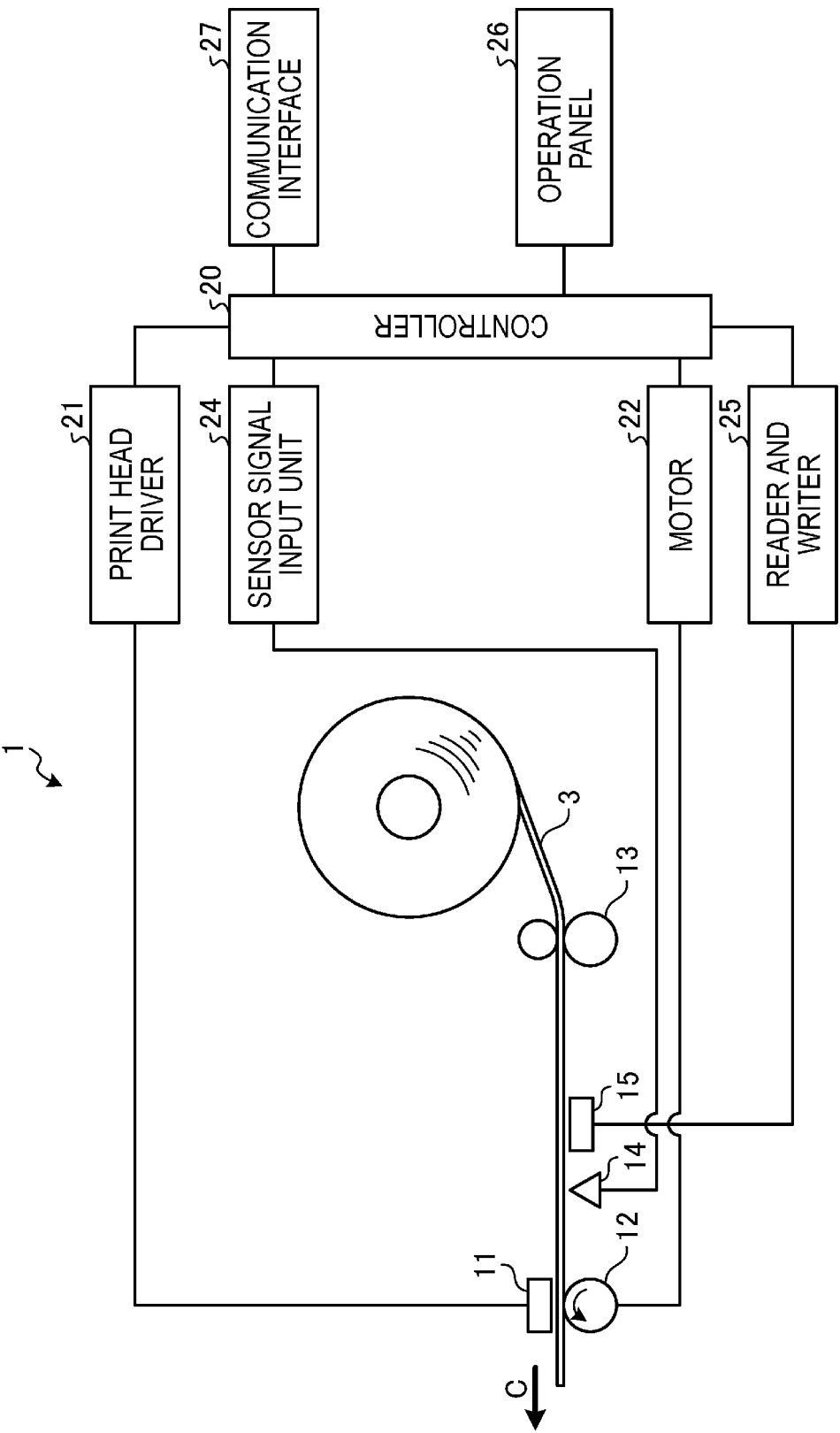
FIG. 1 schematically illustrates an example of a configuration of a printer in a first embodiment.

A first embodiment will be described with reference to the drawings. FIG. 1 is a diagram schematically illustrating an example of a configuration of a printer 1. The printer 1 is an example of a wireless tag writing device.

The printer 1 writes information to a paper sheet 3 wound in a roll shape and outputs the information, and includes a print head 11, a platen roller 12, a conveyance roller pair 13, a mark sensor 14, an antenna 15, a controller 20, a print head driver 21, a motor 22, a sensor signal input unit 24, a reader and writer 25, and an operation panel 26, a communication interface 27, and the like.

The print head 11 presses against the platen roller 12 by urging force such as a spring, and prints on the paper sheet 3 pinched between the print head 11 and the platen roller 12. The print head 11 is, for example, a thermal head, and printing is performed by transferring ink of an ink ribbon melted by heat and the like to the paper sheet 3. The print head 11 is connected to the print head driver 21. The print head driver 21 drives the print head 11.

The motor 22 generates driving force for rotating the platen roller 12 and the conveyance roller pair 13. The platen roller 12 is an example of a conveyance unit, and conveys the paper sheet 3 pinched between the platen roller 12 and the print head 11 by rotating. Here, a direction indicated by an arrow C is a forward direction of the conveyance direction (that is, a direction in which the paper sheet 3 is discharged). When the platen roller 12 is reversely rotated by the motor 22, the platen roller 12 moves the paper sheet 3 in the opposite direction (reverse conveyance direction) of the direction indicated by the arrow C.

The conveyance roller pair 13 pinches the paper sheet 3 on the upstream side in the conveyance direction from the platen roller 12 and rotates, thereby pulling out the paper sheet 3 from the roll and conveying the paper sheet 3. Here, the "upstream side in the conveyance direction" means the upstream side in the forward direction in the conveyance direction, that is, a side farther away from the position where the printer 1 discharges the paper sheet 3.

Figure 4A:
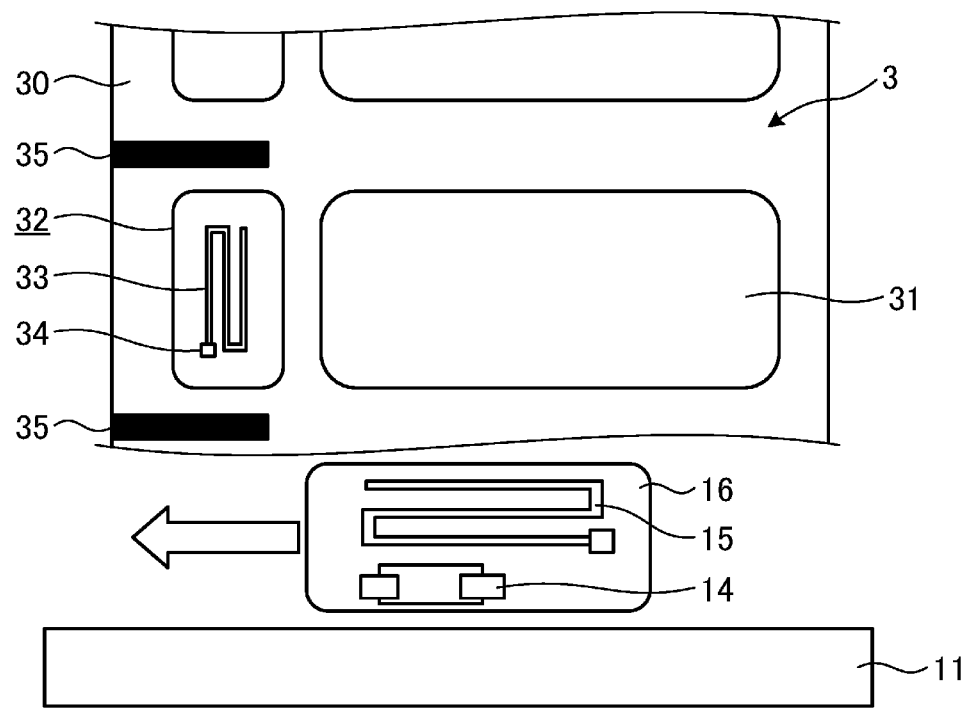
FIG. 4A is a diagram illustrating a positional relationship between the substrate, a print head, and a paper sheet.

Here, the paper sheet 3 is an example of a strip-shaped sheet, and as illustrated in FIG. 4A and the like, a label 31 and an RFID tag 32 are attached to a strip-shaped mount sheet 30. The label 31 is a sheet having predetermined dimension, and a front surface thereof is a printing surface for visible information and a back surface thereof is provided with a glue layer. The RFID tag 32 is a label in which an antenna 33 and an IC chip 34 are enclosed. The radio frequency identification (RFID) tag is an example of a wireless tag. A black mark 35 for indicating the positions of the label 31 and the RFID tag 32 is printed on the mount sheet 30. The position of the black mark 35 and the positions of the label 31 and the RFID tag 32 have a predetermined relationship.

Referring back to FIG. 1, the mark sensor 14 is an example of a sheet position sensor, and detects the position of the paper sheet 3 by, for example, optically detecting the black mark 35 indicating a reference position provided on the mount sheet 30. The mark sensor 14 scans the mount sheet 30 conveyed on a conveyance path along the direction of arrow C, and outputs an ON signal when the mark sensor 14 detects an edge of the black mark 35 on a downstream side of the arrow C, and outputs an OFF signal when the mark sensor 14 detects the edge of the black mark 35 on the upstream side of the arrow C. The mark sensor 14 may be either a reflection type sensor or a transmission type sensor.

Signals from various sensors including the mark sensor 14 are input to the sensor signal input unit 24. The various sensors include also an open and close sensor (not illustrated) or the like for detecting opening and closing of a member to be opened and closed for replacing the mount sheet 30, for example, a cover, a door, a lid or the like.

The reader and writer 25 causes the antenna 15 to radiate an unmodulated wave (electromagnetic wave) to wirelessly communicate with the antenna 33 of the RFID tag 32. The RFID tag 32 receives this unmodulated wave by the antenna 33, starts, and returns a response signal. Then, the antenna 15 receives this response signal. In this way, the reader and writer 25 communicates with the RFID tag 32.

When writing information to the IC chip 34 of the RFID tag 32, the reader and writer 25 amplitude-modulates an electromagnetic wave radiated from the antenna 15 by a signal obtained by encoding write data. The RFID tag 32 reflects and absorbs a received radio wave by changing impedance of the antenna 33. The reader and writer 25 receives the reflected wave from the RFID tag 32 by the antenna 15 and demodulates the reflected wave to obtain reception data from the RFID tag 32.

The IC chip 34 of the RFID tag 32 is provided with a power generation portion, a demodulation portion, a modulation portion, a memory portion, a control portion, and the like. The power generation portion supplies power to each portion of the IC chip 34 by rectifying and stabilizing a signal corresponding to the radio wave received by the antenna 33. The demodulation portion demodulates the signal corresponding to the radio wave received by the antenna 33 and transmits the signal to the control portion. The modulation portion modulates data transmitted from the control portion and transmits the data from the antenna 33. The control portion writes the data demodulated by the demodulation portion to the memory portion, and reads data from the memory portion and transmits the data to the modulation portion.

The memory portion is composed of a setting area for storing and holding data in a non-rewritable manner and a user area for writing any data. An ID code is written in advance in the setting area. The ID code is a code unique to a wireless tag which is set to individually identify each RFID tag 32.

The operation panel 26 has an interface function with a user. The communication interface 27 has an interface function with a host device. The printer 1 receives data to be written on the RFID tag 32, data to be printed on the label 31, and the like from the host device via the communication interface 27.

The print head driver 21, the motor 22, the sensor signal input unit 24, the reader and writer 25, the operation panel 26, and the communication interface 27 are each connected to the controller 20. The controller 20 connects each of the components described above (print head driver 21, motor 22, sensor signal input unit 24, reader and writer 25, operation panel 26, and communication interface 27) of the printer 1 to a control portion that comprehensively controls these components.

Figure 2:
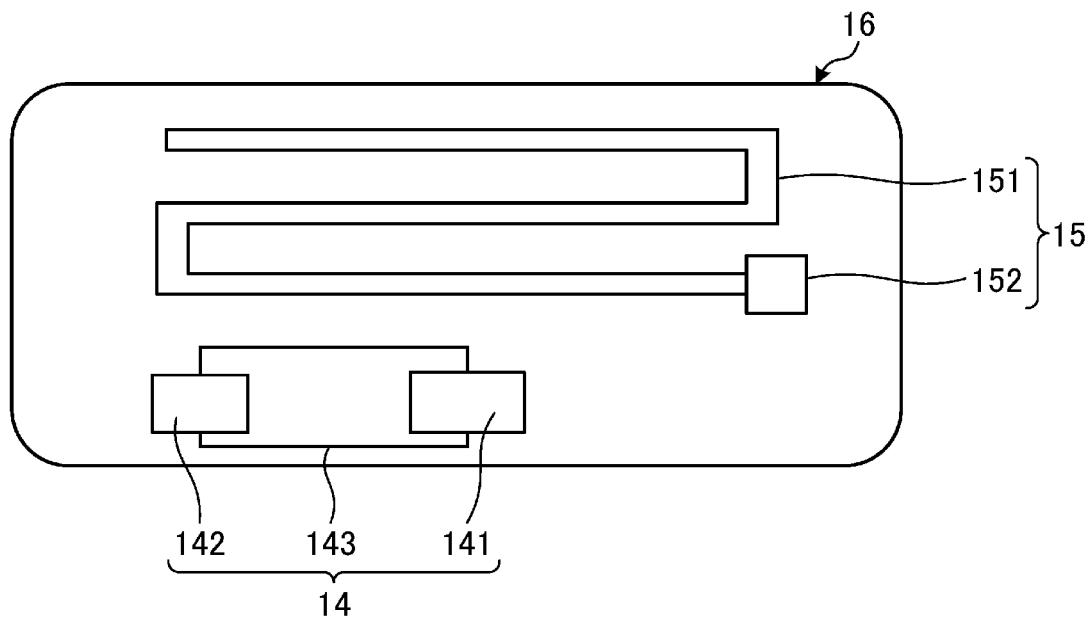
FIG. 2 is a diagram illustrating a substrate provided with a mark sensor and an antenna.

FIG. 2 is a diagram illustrating a substrate 16 provided with the mark sensor 14 and the antenna 15. The mark sensor 14 and the antenna 15 are provided on one substrate 16. The mark sensor 14 includes a sensor element 141, a connector 142 for sensor connected to the sensor signal input unit 24, and a wiring 143 connecting these components. The antenna 15 includes an antenna pattern 151 and a connector 152 connected to the reader and writer 25.

Figure 3:
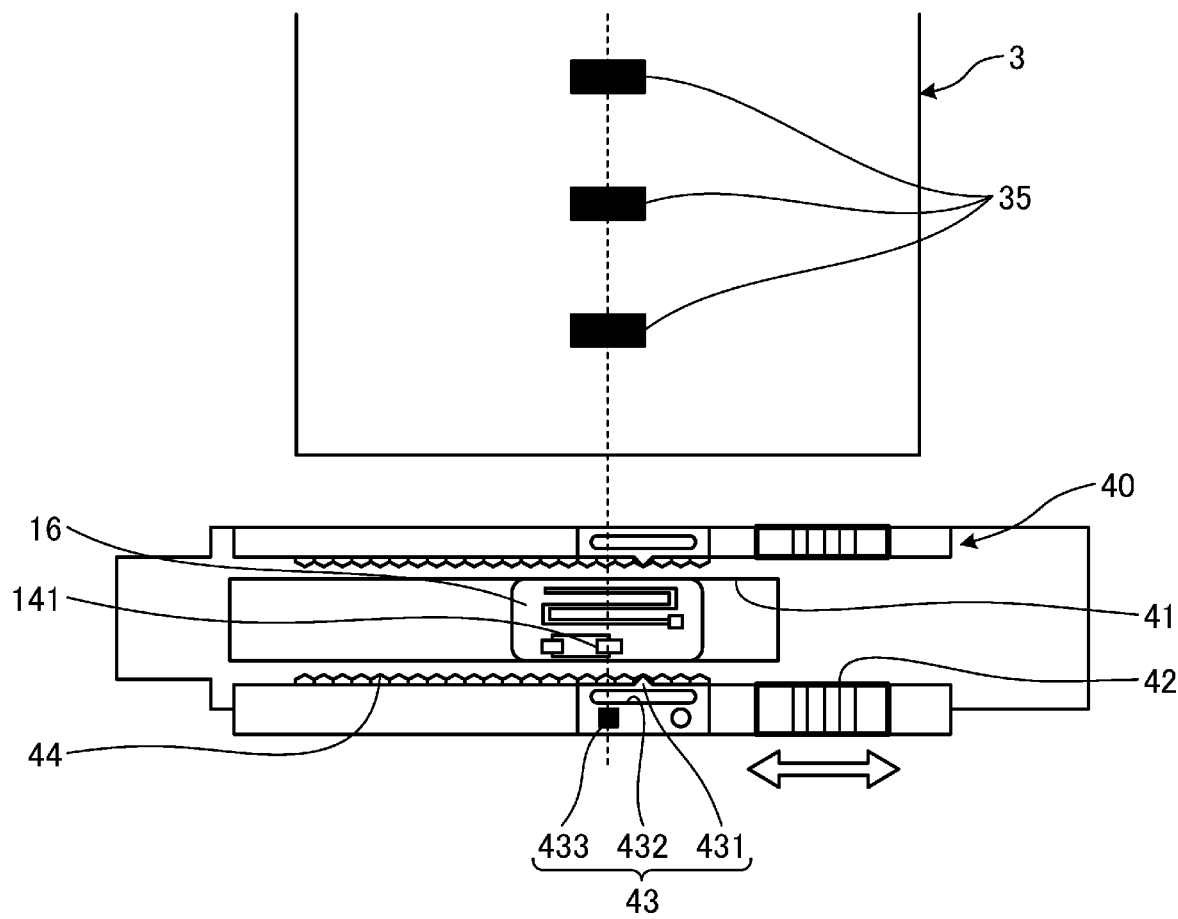
FIG. 3 is a diagram illustrating a structure of a movable portion for moving the substrate.

The substrate 16 is provided so as to be movable in the width direction of the paper sheet 3 and the print head 11. FIG. 3 is a diagram illustrating a structure of a movable portion 40 for moving the substrate 16. The movable portion 40 includes a rail 41, a knob 42, and a slider 43. The slider 43 includes a protrusion 431, an elongated hole 432, and a marker 433.

The substrate 16 is fixed to the slider 43, and the slider 43 is movable with respect to the rail 41. The knob 42 is a portion picked by the user when moving the slider 43 along the rail 41.

The rail 41 is provided with a plurality of recesses 44 in succession. The protrusion 431 is fitted into any of the recesses 44 to fix the position of the slider 43 with respect to the rail 41. The elongated hole 432 imparts elasticity movable in the direction in which the protrusion 431 enters and leaves the recess 44 around the protrusion 431. The marker 433 indicates the position of the sensor element 141.

With such a configuration, in the printer 1, the substrate 16 can be moved in the width direction of the paper sheet 3 and the print head 11. The user operates the knob 42 so that the marker 433 is positioned on an extension line of the black mark 35 on the paper sheet 3 when the paper sheet 3 is set. With this configuration, the substrate 16 is aligned, and the sensor element 141 is in a state capable of detecting the black mark 35 on the paper sheet 3.

Figure 4B:
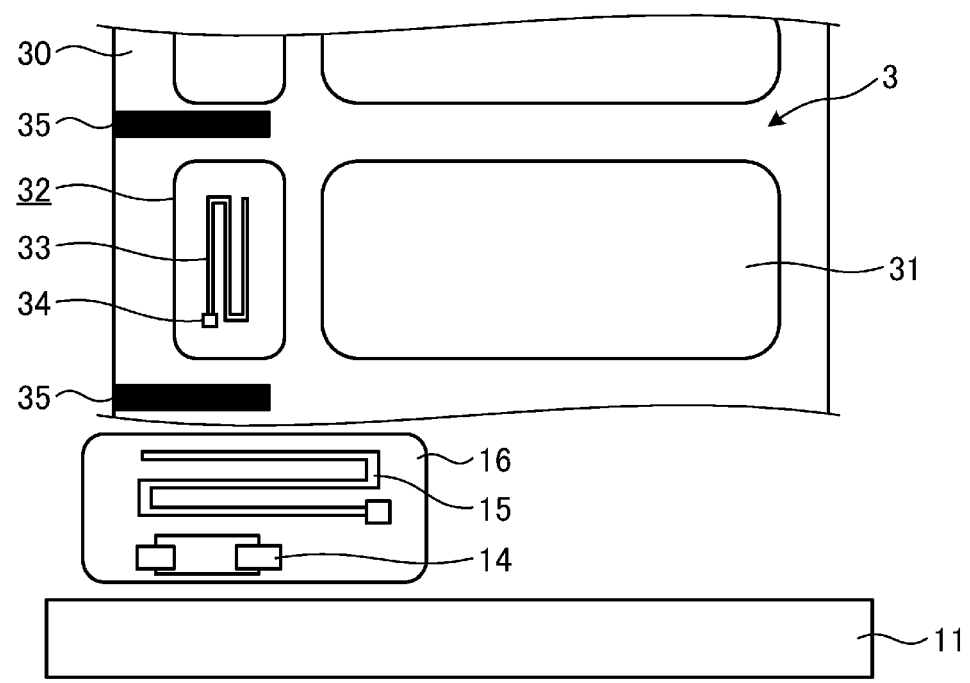
FIG. 4B is a diagram illustrating another positional relationship between the substrate, the print head, and the paper sheet.

FIGS. 4A and 4B are diagrams illustrating the positional relationship between the substrate 16, the print head 11, and the paper sheet 3. In these figures, a direction from top to bottom in the figure is a forward conveyance direction. The substrate 16 is disposed near the upstream side of the print head 11 and the platen roller 12.

In the paper sheet 3 of this embodiment, the label 31 and the RFID tag 32 are disposed in the width direction of the mount sheet 30. The black mark 35 is provided between the RFID tags 32 arranged in the length direction of the mount sheet 30. If the state illustrated in FIG. 4A is obtained when the paper sheet 3 is set, the user moves the substrate 16 in the direction of the arrow to bring the state illustrated in FIG. 4A to a state illustrated in FIG. 4B. With this configuration, the black mark 35 can be detected by the mark sensor 14, and information can be written to the RFID tag 32 by the antenna 15 as well.

The state illustrated in FIG. 4B is a state in which the printer 1 can output. In this state, the printer 1 prints on the surface of the label 31 and the RFID tag 32 by the print head 11 and writes information to the RFID tag 32.

A procedure of output by the printer 1 will be described in more detail. When the printer 1 receives data to be written to the RFID tag 32 or data to be printed to the label 31 from the host device via the communication interface 27, the printer 1 operates the motor 22 to convey the paper sheet 3. Subsequently, the printer 1 stops the motor 22 when the mark sensor 14 is moved by a first length from the position where the black mark 35 is detected so that the antenna 15 comes directly under the antenna 33 of the RFID tag 32. The first length is predetermined by the specifications of the paper sheet 3. Then, the printer 1 writes information to the IC chip 34 of the RFID tag 32 via the antenna 15.

Next, the printer 1 reversely operates the motor 22 to move the paper sheet 3 in a reverse conveyance direction, and causes the mark sensor 14 to detect the black mark 35 again. Subsequently, the printer 1 stops the motor 22 when the print head 11 is moved by a second length from the current position so that the print head 11 is positioned at a print start position on the label 31. The second length is predetermined by the specifications of the paper sheet 3. Then, the printer 1 prints on the label 31 by the print head 11. In this time, printing is also performed on the surface of the RFID tag 32 as needed.

In this way, according to the first embodiment, the substrate 16 can be moved according to the specifications of the paper sheet 3, that is, disposition of the label 31 and the RFID tag 32. That is, the printer 1 of this embodiment can have a certain flexibility degree in design of the corresponding paper sheet 3 (for example, even if the width direction position of the label 31 and the width direction position of the RFID tag 32 are reversed, it can be dealt with). According to this embodiment, the configuration can be provided at low cost and with less sacrifice in throughput and sensing.

Here, description will be made on the low cost and less sacrifice in throughput and sensing described above. First, as a comparison, the inconvenience caused by the conventional configuration will be described. The conventional configuration is different from that of this embodiment, but for the sake of clarity, the parts corresponding to those of this embodiment will be described with the same reference numerals.

Conventionally, there is a printer having a configuration for making the mark sensor 14 easily movable, but in such a printer, even if the antenna 15 for writing to the RFID tag 32 is movable, it takes time and effort to remove a screw and attach the antenna 15 to another place. In the conventional printer, the mark sensor 14 and the antenna 15 are provided on separate substrates. For that reason, a space for installing these two substrates is required on the upstream side of the print head 11. Furthermore, in order to make the antenna 15 movable, a movable portion different from the movable portion for the mark sensor 14 needs to be added.

Cost increases due to such an increase in the number of substrates and movable portions. Since a free space around the print head 11 is often not widely taken, an increase in the number of substrates and movable portions is not preferable. Furthermore, if the substrates are installed side by side in the conveyance direction in order to widen a movable range of the substrates, one of the substrates is installed away from the print head 11, and thus the distance for reverse-conveying the paper sheet 3 becomes long, and throughput is reduced.

The shortest dimension of the label 31 that can be printed by the printer 1 in the conveyance direction is related to the distance (distance between head sensors) between the print head 11 and the mark sensor 14 (for example, if the distance between head sensors is 10 mm, the label 31 whose dimension in the conveyance direction is 10 mm or less cannot be used). Accordingly, if the substrate of the mark sensor 14 is installed away from the print head 11, the shortest dimension of the usable label 31 in the conveyance direction becomes long (for example, if a substrate for an antenna 15 of 20 mm is inserted between the print head 11 and the mark sensor 14 when the distance between head sensors is 10 mm, the substrate cannot be used unless the label 31 exceeds 30 mm). In this way, when a movable portion that makes the substrate of the antenna 15 movable is simply added to the conventional configuration, various inconveniences occur.

In contrast to the conventional configuration described above, in the printer 1 of this embodiment, first, the mark sensor 14 and the antenna 15 are provided on the same substrate 16. With this configuration, the installation space can be reduced as compared with the case where the mark sensor 14 and the antenna 15 are provided on separate substrates.

In the printer 1 of this embodiment, since the mark sensor 14 and the antenna 15 are provided on the same substrate 16, the mark sensor 14 and the antenna 15 can be moved by one movable portion 40. Accordingly, the cost for adding the movable portion can be eliminated.

Furthermore, by providing the mark sensor 14 and the antenna 15 on the same substrate 16, the distance between the mark sensor 14 and the print head 11 becomes short, and thus the shortest dimension of the usable label 31 in the conveyance direction can be shortened. Similarly, since the distance between the antenna 15 and the print head 11 becomes short, the distance for reverse-conveying the paper sheet 3 can be shortened, so that throughput can be improved.

In the embodiment described above, the mark sensor 14 is disposed closer to the print head 11 than the antenna 15, but in implementation, the antenna 15 may be disposed closer to the print head 11 than the mark sensor 14. Even in this way, the effect of providing the mark sensor 14 and the antenna 15 on the same substrate 16 can be obtained. The effect is, for example, that the installation space can be saved and the cost can be suppressed because only one movable portion 40 is required.

Second Embodiment

Next, a second embodiment will be described with reference to the drawings. This embodiment is a modification example of the first embodiment, and thus detailed description of the parts common to the first embodiment will be omitted, and the parts different from the first embodiment will be described in detail using the same reference numerals.

Figure 5:
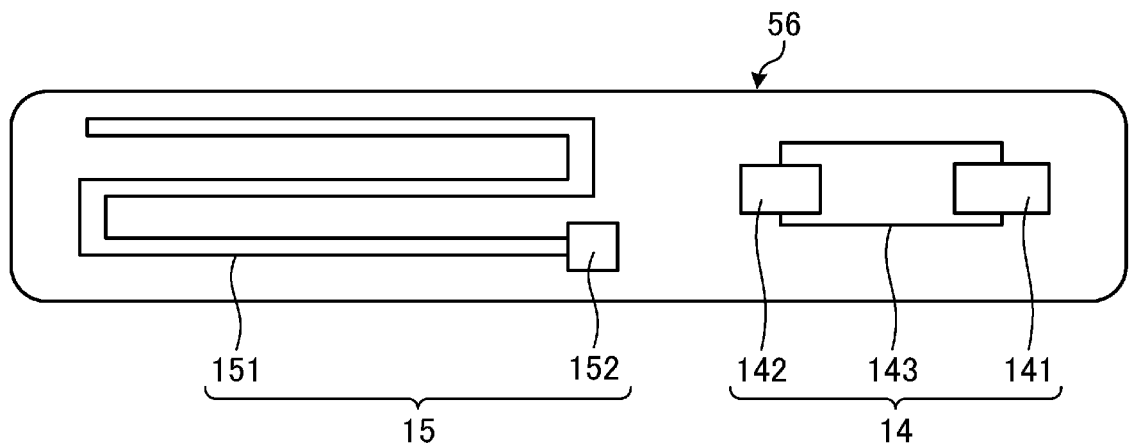
FIG. 5 is a diagram illustrating a substrate provided with the mark sensor and the antenna in a second embodiment.

FIG. 5 is a diagram illustrating a substrate 56 provided with the mark sensor 14 and the antenna 15. In this embodiment, the mark sensor 14 and the antenna 15 provided on the substrate 56 are arranged in the width direction of the paper sheet 3. With such the substrate 56, although the movable range in the width direction is narrower than that of the first embodiment, there is an advantage that both the mark sensor 14 and the antenna 15 can be disposed in the vicinity of the print head 11.

Also, in the second embodiment described above, similarly to the first embodiment, since the mark sensor 14 and the antenna 15 are provided on the same substrate 16, the installation space can be reduced as compared with the case where the mark sensor 14 and the antenna 15 are provided on separate substrates.

Also, in this embodiment, similarly to the first embodiment, since the mark sensor 14 and the antenna 15 can be moved by one movable portion 40 by providing the mark sensor 14 and the antenna 15 on the same substrate 16, cost for adding the movable portion can be eliminated.

Furthermore, since the distance between the mark sensor 14 or the antenna 15, which were conventionally disposed away from the print head 11, and the print head 11 becomes closer than before by providing the mark sensor 14 and the antenna 15 on the same substrate 16, throughput can be improved.

Third Embodiment

Next, a third embodiment will be described with reference to the drawings. This embodiment is a modification example of the first embodiment, and thus detailed description of the parts common to the first embodiment will be omitted, and the parts different from the first embodiment will be described in detail using the same reference numerals.

Figure 6:
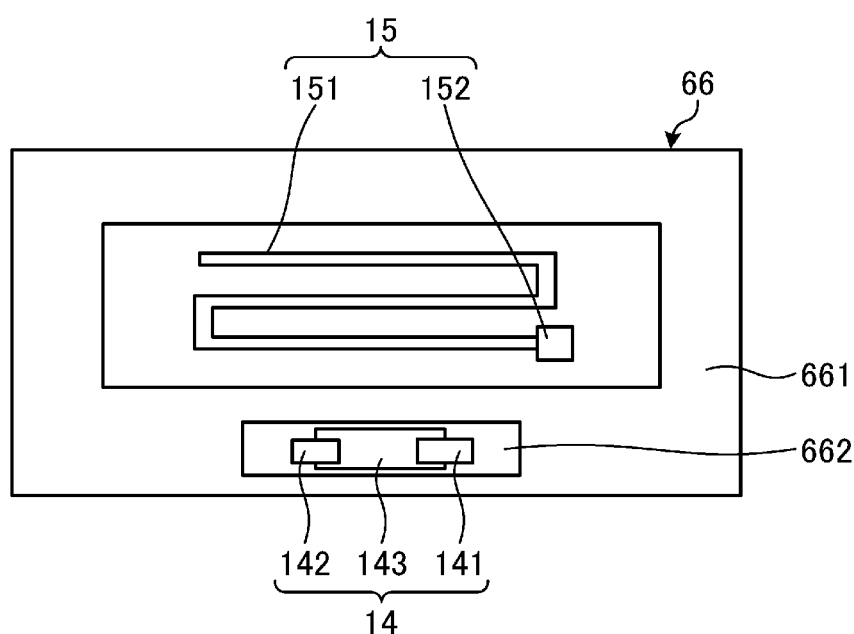
FIG. 6 is a diagram illustrating a substrate provided with the mark sensor and the antenna in a third embodiment.

FIG. 6 is a diagram illustrating a substrate 66 provided with the mark sensor 14 and the antenna 15. Conventionally, the substrate on which the antenna 15 is mounted is often considered not to be mounted with other elements from the viewpoint of stabilizing performance. Therefore, if the performance (gain, and the like) of the antenna 15 is a concern, as illustrated in FIG. 6, the periphery of the antenna 15 of the substrate 66 is filled with a ground pattern 661 and the mark sensor 14 is provided in a vacant lot space 662 provided in the ground pattern 661. With this configuration, the mark sensor 14 can be brought into a state hardly affecting the antenna 15.

Also, in the third embodiment as described above, the same effect as that of the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:
a print head configured to print on a strip-shaped sheet;
a platen roller configured to move the strip-shaped sheet pinched between the platen roller and the print head along a longitudinal direction of the strip-shaped sheet;
a sheet position sensor provided on a movable substrate disposed on an upstream side of the print head in a conveyance direction of the strip-shaped sheet and configured to detect a position of the strip-shaped sheet;
an antenna provided on the movable substrate and configured to write information to a wireless tag provided on the strip-shaped sheet; and
a movable portion configured to move the movable substrate along a width direction of the strip-shaped sheet so that the sheet position sensor and the antenna move in tandem and move with respect to the printer.

2. The printer according to claim 1, wherein the sheet position sensor and the antenna are provided side by side along the conveyance direction of the strip-shaped sheet.

3. The printer according to claim 2, wherein the sheet position sensor is disposed on a side closer to the print head than the antenna.

4. The printer according to claim 1, wherein
the substrate comprises a ground pattern that surrounds the antenna, and
the sheet position sensor is provided on the ground pattern.

5. The printer according to claim 1, wherein the antenna is further configured to amplitude-modulate an electromagnetic wave radiated therefrom by a signal obtained by encoding write data.

6. The printer according to claim 1, wherein the movable portion comprises a rail, a knob, and a slider.

7. The printer according to claim 1, wherein the movable substrate comprises a mark sensor.

8. The printer according to claim 1, wherein the print head is a thermal head.

9. The printer according to claim 1, wherein the strip-shaped sheet comprises a label, an RFID tag, and a mount sheet.

10. The printer according to claim 1, wherein the strip-shaped sheet is obtained from a wound roll shape strip-shaped sheet.

11. A wireless tag writing device, comprising:
a conveyance component configured to move a strip-shaped sheet provided with a wireless tag along a longitudinal direction of the strip-shaped sheet;
a sheet position sensor provided on a movable substrate disposed on an upstream side of the conveyance component in a conveyance direction of the strip-shaped sheet, and configured to detect a position of the strip-shaped sheet;
an antenna provided on the movable substrate and configured to write information to the wireless tag provided on the strip-shaped sheet; and
a movable portion configured to move the movable substrate along a width direction of the strip-shaped sheet so that the sheet position sensor and the antenna move with respect to the wireless tag writing device in tandem.

12. The wireless tag writing device according to claim 11, wherein the sheet position sensor and the antenna are provided side by side along the conveyance direction of the strip-shaped sheet.

13. The wireless tag writing device according to claim 11, wherein
the substrate comprises a ground pattern that surrounds the antenna, and
the sheet position sensor is provided on the ground pattern.

14. The wireless tag writing device according to claim 11, is further configured to amplitude-modulate an electromagnetic wave radiated therefrom by a signal obtained by encoding write data.

15. The wireless tag writing device according to claim 11, wherein the movable portion comprises a rail, a knob, and a slider.

16. A printing method, comprising:
moving a strip-shaped sheet pinched between a platen roller and a print head along a longitudinal direction of the strip-shaped sheet;
printing on a strip-shaped sheet;
detecting a position of the strip-shaped sheet from an upstream side of the print head in a conveyance direction;
writing information to a wireless tag provided on the strip-shaped sheet; and
moving a movable substrate comprising a sheet position sensor and an antenna along a width direction of the strip-shaped sheet so that the sheet position sensor and the antenna move in tandem.

17. The printing method according to claim 16, further comprising:

amplitude-modulating an electromagnetic wave radiated from by a signal obtained by encoding write data.

18. The printing method according to claim 16, further comprising:
    obtaining the strip-shaped sheet from a wound roll shape strip-shaped sheet.

19. The printing method according to claim 16, further comprising:
    writing information to an RFID tag.

* * * * *